(12) United States Patent
Bruggaier et al.

(10) Patent No.: US 11,897,653 B2
(45) Date of Patent: Feb. 13, 2024

(54) APPARATUS AND METHOD FOR CLOSING A SAMPLE CONTAINER

(71) Applicant: Beckman Coulter, Inc., Brea, CA (US)

(72) Inventors: Christoph Bruggaier, Munich (DE); Diana Illichmann, Munich (DE)

(73) Assignee: Beckman Coulter, Inc., Brea, CA (US)

( * ) Notice: Subject to any disclaimer, the term of this patent is extended or adjusted under 35 U.S.C. 154(b) by 87 days.

(21) Appl. No.: 17/606,395

(22) PCT Filed: Apr. 22, 2020

(86) PCT No.: PCT/IB2020/053794
§ 371 (c)(1),
(2) Date: Oct. 25, 2021

(87) PCT Pub. No.: WO2020/217182
PCT Pub. Date: Oct. 29, 2020

(65) Prior Publication Data
US 2022/0194638 A1 Jun. 23, 2022

(30) Foreign Application Priority Data
Apr. 25, 2019 (EP) ..................................... 19171059

(51) Int. Cl.
*B65B 7/28* (2006.01)
(52) U.S. Cl.
CPC ............ *B65B 7/2821* (2013.01); *B65B 7/285* (2013.01)
(58) Field of Classification Search
CPC .... B65B 7/00; B65B 7/01; B65B 7/16; B65B 7/28; B65B 7/2821; B65B 7/2828; B65B 7/285; B67B 1/04; B67B 1/06; G01N 2035/0405

USPC .......................... 53/487, 489, 290, 296, 319
See application file for complete search history.

(56) References Cited

U.S. PATENT DOCUMENTS

| | | | | |
|---|---|---|---|---|
| 2,301,949 A | * | 11/1942 | Hothersall | ............. B21D 51/34 53/296 |
| 2,319,234 A | | 5/1943 | Hothersall | |
| 3,124,917 A | * | 3/1964 | Dobbins | ................... B65B 7/28 53/489 |
| 3,204,387 A | | 9/1965 | Scheindel | |

(Continued)

FOREIGN PATENT DOCUMENTS

GB        1028623       5/1966

OTHER PUBLICATIONS

"European Application Serial No. 19171059.9, Extended European Search Report dated Oct. 17, 2019", 11 pages.

*Primary Examiner* — Stephen F. Gerrity
(74) *Attorney, Agent, or Firm* — Schwegman Lundberg & Woessner, P.A.

(57) ABSTRACT

An applicator assembly (100) for closing a sample container (500) with a plug (16) is proposed. The applicator assembly comprises a magazine (102) configured to store a string (10) comprising polymer-based material, an insertion device (104) configured to insert an end piece (12) of the string at least partly into an opening (502) of the sample container (500), and a drive system (106) configured to supply at least a part of the string (10) from the magazine (102) to the insertion device (104). The applicator assembly further comprises a separator (108) configured to separate the end piece (12) from the string, such that the end piece (12) forms a plug (16) closing the sample container (500).

14 Claims, 4 Drawing Sheets

(56) References Cited

U.S. PATENT DOCUMENTS

| | | | | |
|---|---|---|---|---|
| 3,625,786 A | * | 12/1971 | Pearson et al. ....... | B65B 7/2821 |
| | | | | 53/489 |
| 5,261,211 A | * | 11/1993 | Hartzell et al. ..... | A61M 31/002 |
| | | | | 53/452 |
| 2003/0221395 A1 | | 12/2003 | Willstumpf | |

* cited by examiner

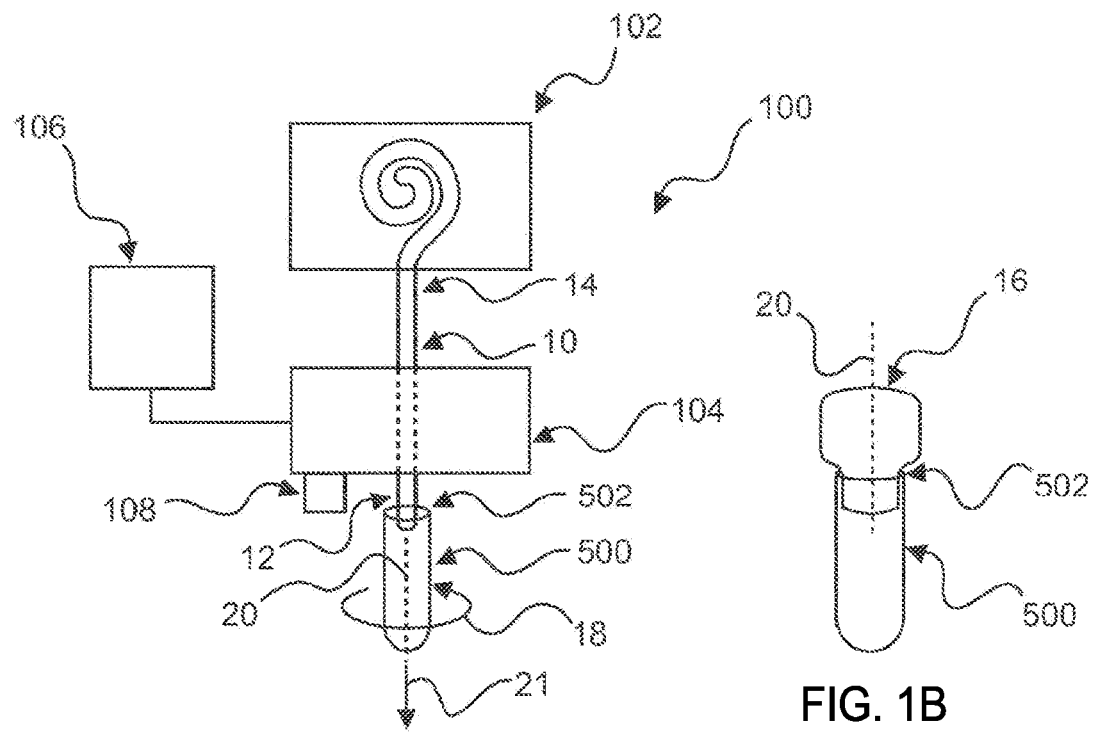
FIG. 1A
FIG. 1B
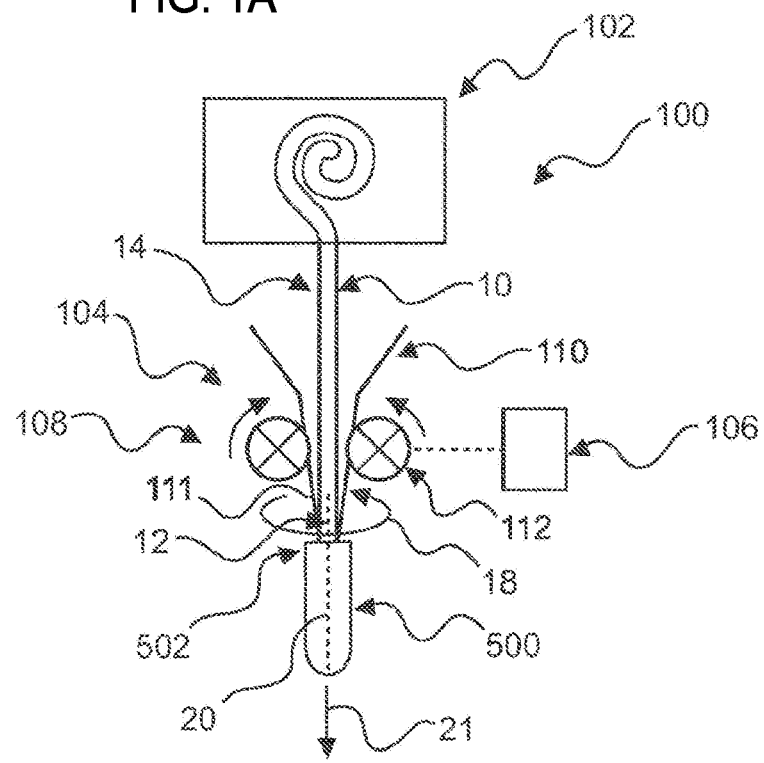
FIG. 2

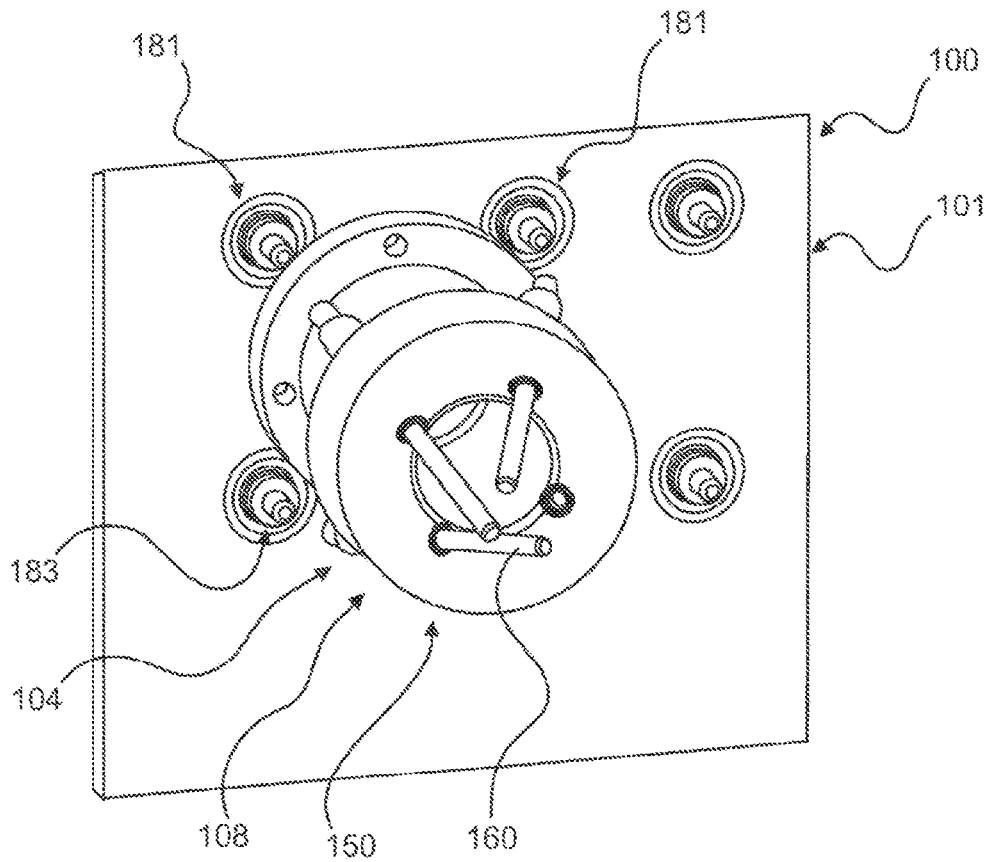

FIG. 5C

STEP S1

AT LEAST A PART OF AN END PIECE 12 OF A STRING 10 COMPRISING POLYMER-BASED MATERIAL IS INSERTED INTO AN OPENING 502 OF A SAMPLE CONTAINER 500 WITH AN INSERTION DEVICE 104 OF THE APPLICATOR ASSEMBLY 100

STEP S2

THE END PIECE 12 IS SEPARATED FROM THE STRING 10 AND/OR FROM A REMAINING PART 14 OF THE STRING 10 BY MEANS OF A SEPARATOR 108 OF THE APPLICATOR ASSEMBLY 100, THEREBY FORMING A PLUG 16 CLOSING THE OPENING 502 OF THE SAMPLE CONTAINER 500

FIG. 6

APPARATUS AND METHOD FOR CLOSING A SAMPLE CONTAINER

CROSS-REFERENCE TO RELATED APPLICATION

This application is a U.S. National Stage Filing under 35 U.S.C. 371 from International Application No. PCT/M2020/053794, filed on Apr. 22, 2020, and published as WO/2020/217182 on Oct. 29, 2020, which application claims the benefit of priority to European Patent Application Number 19171059.9, filed Apr. 25, 2019, which applications are incorporated herein by reference in their entireties.

FIELD OF THE INVENTION

The present invention, generally, relates to a laboratory automation. Particularly, the present invention relates to an applicator assembly for closing a sample container with a plug using a string comprising polymer-based material. Further, the invention relates to the use of a string comprising polymer-based material for closing a sample container with such applicator assembly and to a method of closing a sample container with such applicator assembly.

TECHNICAL BACKGROUND

In typical laboratories, such as e.g. clinical laboratories, usually a large number of sample containers comprising sample material is handled and/or processed per unit time in an at least partly automated manner. Therein, the handling and/or processing may, for example, comprise transporting the sample containers between different work cells or areas of the laboratory, e.g. by means of an at least partly automated transport system. Also, sample containers may be stored at least temporarily in a typical laboratory workflow, e.g. in one or more sample container racks. Particularly during transportation and/or storage of the sample containers, it may be desirable to protect the contents of the sample containers, i.e. the sample material contained in the sample containers, against e.g. loss of sample material, leakage, spillage, pollution and/or cross contamination. For this reason, the sample containers are usually closed with a plug and/or cap, wherein the plugs and/or caps are preferably applied to the sample containers or removed therefrom in an at least partly automated manner, e.g. using a capper and/or decapper device.

Further, different types of sample containers may be handled and/or processed in a laboratory, wherein the different types of sample containers may differ, inter alia, in size, mechanical (or geometrical) dimension, volume, tube diameter, diameter of an opening of the sample containers and/or shape. Automation systems and/or devices used for at least partly automating the laboratory workflow, therefore, should preferably be suitable for handling a lot of different types of sample containers. Individual caps and/or plugs currently utilized in laboratories, however, may cover a limited diameter range only. Hence, the caps and/or plugs may only be suitable for a specific type of sample containers. Also, sample containers with a stepped inner diameter may be used in labs, which may require specific caps and/or plugs with a specific design, shape and/or geometry.

Due to the different types of sample containers that are to be handled in at least partly automated manner in a lab and because caps and/or plugs usually come in a bulk package, the caps and/or plugs may have to be decollated and/or aligned before they can be inserted into and/or applied to the sample containers. This may require complicated and expensive mechanisms as well as special devices, such as e.g. a re-capper robot, to handle the individual caps and/or plugs and apply them to the sample containers. Further, Parafilm pads are currently used to protect sample container content. These Parafilm pads, however, may be inconvenient to use in an automated environment and may require complicated mechanisms for applying them to the sample containers.

GENERAL DESCRIPTION OF THE INVENTION

It may be desirable to provide for an improved solution and/or apparatus for closing a sample container with a cap and/or plug, e.g. in a laboratory and/or laboratory environment.

This is achieved by the subject matter of the independent claims, wherein further embodiments are incorporated in the dependent claims and the following description.

A first aspect of the present disclosure relates to an applicator assembly for closing a sample container with a plug (also referred to as cap hereinafter). A second aspect of the present disclosure relates to a use of a string comprising polymer-based material with such applicator assembly for closing a sample container, and a third aspect of the present disclosure relates to a method of closing a sample container with such applicator assembly. It should be noted that any feature, function and/or element described in the following with reference to the applicator assembly equally applies to the use of the string and/or the method, and vice versa. Accordingly, any feature, function, step and/or element described in the following with reference to one aspect of the present disclosure equally applies to any other aspect of the present disclosure.

The first aspect of the present disclosure relates to an applicator assembly and/or apparatus for inserting a plug at least partly into a sample container (and/or an opening thereof) and/or for closing a sample container (and/or an opening thereof) with a plug. Generally, the applicator assembly may be semi-automated or fully automated. In other words, by means of the applicator assembly, the plug can be inserted into the sample container and/or the sample container can be closed with the plug in an at least partly automated manner. The applicator assembly comprises a magazine configured to store a string comprising polymer-based material, an insertion device configured to insert an end piece of the string at least partly into an opening of the sample container, and a drive system configured to supply at least a part of the string from the magazine to the insertion device and/or configured to drive at least a part of the insertion device, such that the end piece is at least partly inserted into and/or applied to the opening of the sample container. The applicator assembly further comprises a separator configured to separate the end piece from the string and/or from a remaining part of the string, such that the end piece forms a plug closing, e.g. substantially or entirely closing, the sample container and/or the opening of the sample container.

By using the string comprising polymer-based material and by separating the end piece of the string to form the plug closing the sample container, the sample container can be efficiently and reliably closed. Further, using e.g. an appropriate material and/or diameter of the string, sample containers of different sizes, volumes, diameters, mechanical dimensions, and/or opening diameters (i.e. diameters of the openings of the sample containers) can be reliably, efficiently and quickly be closed. Further, by separating the end piece from the string and/or a remaining part of the string to form the plug and to close the sample container, production costs for the plug can be significantly reduced, inter alia, because many plugs can be generated per unit time and/or because material costs can be kept at a minimum. Also, by means of the present invention, plugs may not have to be decollated and/or aligned prior to insertion into a sample container. This may render complicated and expensive mechanisms as well as special devices, such as e.g. a re-capper robot, to handle individual plugs and apply them to the sample containers obsolete. Accordingly, a cost-efficient, efficient, fast, improved, simplified and/or reliable solution for closing sample containers may be provided by the present invention. Thereby, an overall process of handling sample containers e.g. in a laboratory can be significantly improved.

Here and in the following, the magazine may refer to a storage, storage structure and/or storage compartment configured to store, comprise and/or at least partly encompass the string. Alternatively or additionally, the magazine may refer to a support structure and/or support for supporting and/or holding at least a part of the string. In other words, at least a part of the string may be supported and/or stored in the magazine. By way of example, at least a part of the string may be coiled and/or rolled-up when stored and/or comprised in the magazine. Alternatively or additionally, at least a part of the string may be loosely contained, arranged and/or stored in the magazine. Generally, the magazine may be configured such that at least a part of the string can be transported and/or dragged from the magazine to the insertion device, preferably without getting stuck in the magazine and/or a part thereof.

The sample container may denote and/or refer to any type of container for storing any type of medium, material, and/or sample material. Therein, the medium, material and/or sample material may be a fluid material, a liquid material, a solid material or a mixture thereof. For instance, the sample container may refer to a sample tube, a vial and/or any other type of container. Therein, the sample container may comprise an opening for inserting the medium, material and/or sample material into the sample container, an interior volume of the sample container and/or a storage compartment of the sample container. Accordingly, the interior volume and/or the storage compartment of the sample container may be accessible via the opening of the sample container. Further, the medium, material and/or sample material may be removed from the sample container via the opening.

In the context of the present disclosure, the string may refer to an elongated element comprising polymer-based material. For instance, the string may refer to a strand, cord and/or thread-like element. Alternatively or additionally, the string may have a cylindrical shape. Therein, a cross-section, cross-sectional area and/or cross-sectional geometry of the string may be arbitrarily shaped, such as e.g. round, oval, circular, angularly, square, rectangular, triangular or the like.

The string and/or a material thereof may be at least partly compressible, stretchable, flexible and/or deformable. For instance, an outer circumference, diameter and/or perimeter of the string can be reduced by exerting a corresponding force onto the string, e.g. a force directed at least partly towards a longitudinal axis and/or center axis of the string, and/or by compressing the string. Alternatively or additionally, a length and/or shape of the string may be varied by applying a respective force onto the string. Alternatively or additionally, the string and/or the material thereof may be at least partly elastic. Accordingly, the string may be elastically deformable and/or elastically compressible. In other words, the string may be deformed, compressed, stretched, and/or elongated, e.g. by exerting a respective force onto the string. Further, the string may resume, substantially or entirely, its original shape, length, geometry and/or form when the force is removed.

The string may comprise an arbitrary polymer-based material, preferably providing a certain elasticity and/or flexibility, such that the end piece of the string can be inserted into the opening, e.g. by elastically deforming and/or compressing at least a part of the end piece.

The end piece of the string may refer to a part of the string arranged on one end of string. A length of the end piece, which may be measured parallel to a longitudinal axis of the string and/or the end piece, may range from several millimeters to several centimeters. The length of the end piece may, for instance, range from 0.3 mm to 20 cm, particularly from 0.5 mm to 5 cm.

In the context of the present disclosure, it may be referred to the end piece as a part, end part and/or end of the string which is attached and/or connected to a remaining part and/or rest of the string. When the end piece is separated, physically separated and/or detached from the remaining part of the string, the end piece may form and/or may be referred to as plug. The plug may also be referred to as a cap closing the opening of the sample container. For closing the sample container and/or the opening thereof, at least a part of the end piece and/or the plug may be arranged in the opening and/or in an interior volume of the sample container. When inserted into the opening, the at least part of the end piece and/or the plug (and/or the material thereof) may expand inside the sample container, such that the end/piece and/or the plug closes the opening of the sample container, particularly of the end piece was compressed during insertion into the opening. Alternatively or additionally, a diameter of the string may substantially correspond to a diameter of the opening of the sample container.

Generally, the separator may refer to a separator device and/or may be configured to separate, detach, isolate, disconnect, sever and/or remove the end piece from the string and/or from the remaining part of the string, e.g. after and/or when the end piece is at least partly inserted into the opening. The separator may be configured to separate the end piece from the remaining part of the string, such that a part and/or an end of the plug extends from an end of the sample container. This may simplify removing the plug from the sample container, e.g. by pulling out the plug. Alternatively, the separator may be configured to separate the end piece from the remaining part of the string, such that an end of the plug and the end of the sample container are substantially flush. In this case, the plug may be removed from the sample container e.g. by corkscrew mechanism. Further, at least a part of the separator or the entire separator may be an integral part of the insertion device and/or of the drive system. In other words, a function and/or configuration of the separator can be a function and/or configuration of the insertion device and/or the drive system.

The drive system may refer to a transport system and/or may be configured to transport, move and/or convey the end piece of the string from the magazine to the insertion device and into the opening of the sample container. Therein, the drive system may be configured to exert a driving force directly onto the string and/or the end piece to supply and/or move the string and/or the end piece to the insertion device. Alternatively or additionally, the drive system may be configured to drive the at least part of the insertion device, such that the at least part of the insertion device exerts a driving force onto the string to move and/or insert the end piece at least partly into the opening. Accordingly, the drive system may be configured to directly drive the string, to indirectly drive the string by driving the at least part of the insertion device, or both. Further at least a part of the drive system and/or the entire drive system may be an integral part of the insertion device. In other words, a function and/or configuration of the drive system can be a function and/or configuration of the insertion device.

According to an embodiment, the separator is configured to cut off and/or shear off the end piece from the string to form the plug. The separator may, for example, comprise one or more cutting elements and/or cutters configured to mechanically cut off, pinch off and/or shear off the end piece from the remaining part of the string to form the plug. Optionally, at least a part of the separator may be heated such that a material of the string can be locally melted to separate the end piece from the remaining part of the string.

According to an embodiment, the separator is configured to rotate at least a part of the insertion device along and/or in a circumferential direction of the end piece (and/or a circumferential direction of the insertion device) to shear off the end piece from the string and/or from the remaining part of the string. Generally, the separator may be configured to rotate the at least part of the insertion device such that the end piece and the remaining part of the string may be rotated relative to each other. For example, the end piece may be substantially fixed by a part of the insertion device and/or by the sample container, in which at least a part of the end piece may be arranged, and the remaining part of the string may be rotated by rotating the at least part of the insertion device. Alternatively, the sample container with the at least part of the end piece inserted therein may be rotated and the remaining part of the string may be substantially fixed e.g. by the insertion device. Further, the separator may be configured to rotate the end piece along a first circumferential direction of the end piece (and/or a first circumferential direction of the insertion device) and to rotate the remaining part of the string along a second circumferential direction of the end piece (and/or a second circumferential direction of the insertion device) opposite to the first circumferential direction in order to shear off the end piece from the remaining part. It should be noted that the separator may be configured to rotate only a part of the insertion device, the entire insertion device and/or other components of the applicator assembly to shear off the end piece. Moreover, the separator may be configured to rotate substantially the entire applicator assembly with respect to the sample container in order to separate the end piece and the remaining part of the string.

According to an embodiment, the string comprises at least one of a foam material, a closed cell foam material, a compressible material, and a plastic material. For example, the string may comprise Polyethylen, Low-Density Polyethylene (LDPE) and/or any other foam and/or plastic material. The string and/or the material thereof may optionally be reinforced. For example, the string may comprise fibers for increasing a mechanical stability of the string. By using a string comprising one or more of the materials described hereinabove, it may be ensured that a circumference and/or diameter of the string and/or the end piece can be significantly reduced by compressing, with a compressing force, the string and/or end piece with respect to a state of the string and/or end piece, in which no compressing force is applied. This may allow inserting the end piece into sample containers having different volumes, sizes, diameters and/or opening diameters. When inserted into the opening of the sample container and when the compressing force is removed, the end piece may expand within the sample container, thereby closing the opening. This may allow to use the string for closing basically all available sample containers in a laboratory in an efficient and reliable manner. In other words, the plugs formed from the string according to the present disclosure may cover the entire range of sample container diameters. In contrast thereto, currently available individual caps and/or plugs for sample containers cover only a limited range of diameters of sample containers and/or diameters of openings of sample containers.

Moreover, by using one or more of the aforementioned materials for the string, a weight of an individual plug may be significantly reduced with respect to currently available plugs for sample containers. Therein, the weight of an individual plug may, for instance, be below 3 gram, for example below 1 gram, and in particular in the range of some milligrams. Accordingly, an environmental impact and thus a carbon foot print may be significantly reduced. Further, due to the reduced weight of an individual plug, it may be ensured that the plug remains in place after insertion into the sample container, e.g. during centrifugation of the sample container, during transportation and/or if a sample container falls to the ground.

According to an embodiment, the insertion device is configured to compress at least a part of the end piece to insert the end piece of the string at least partly into the opening of the sample container. Generally, this may simplify insertion of the end piece into the sample container. Apart from that, compressing the end piece may allow to reliably insert the end piece into the opening, e.g. to a desired and/or predetermined depth. Also, the same string and/or a string having a fixed diameter (in a state, in which no compression force is applied) may be used for closing different sample containers having different diameters and/or opening diameters.

According to an embodiment, the insertion device comprises at least one linear motion element configured to translate and/or move the end piece of the string along and/or parallel to a longitudinal direction of the string, a longitudinal direction of the end piece and/or a longitudinal direction of the insertion device in order to insert the end piece at least partly into the opening of the sample container. Therein, the longitudinal direction of the end piece, the string and/or the insertion piece may be parallel to the longitudinal axis of the end piece, the string and/or the insertion device. By way of example, one or more linear motion elements may be arranged around the string, wherein each motion element may be configured to apply a driving force substantially parallel to the longitudinal axis of the string and/or the end piece, as exemplary described with reference to FIGS. 2 and 3. Therein, the one or more linear motion elements may be driven by the drive system. Further, each linear motion element may comprise e.g. a roller, drive roller, a tap drive, a belt drive, a conveyor drive or the like.

According to an embodiment, the insertion device comprises a first rotatable member configured to rotate the end piece of the string along a first circumferential direction of the string (and/or of the end piece) and to translate the end piece of the string along and/or parallel to a longitudinal direction of the string (and/or of the end piece) to insert the end piece at least partly into the opening of the sample container. Accordingly, the first rotatable member of the insertion device may be configured to exert a rotational force onto the end piece for rotating the end piece along and/or in the first circumferential direction. Further, the first rotatable member may be configured to exert a translational force onto the end piece for moving and/or translating the end piece parallel to the longitudinal axis of the end piece, e.g.

in direction of and/or towards the sample container. Generally, the first rotatable member and/or the insertion device may be configured such that a rotational movement of the first rotatable member induces the rotation of the end piece along the first circumferential direction and the translational movement of the end piece parallel to the longitudinal axis and/or in longitudinal direction of the end piece.

For instance, the first rotatable member may comprise and/or refer to at least one rotatable pin and/or an elongated rotatable element, which may be arranged skew with respect to a longitudinal axis of the end piece. An outer and/or lateral surface of the first rotatable member may contact a lateral surface of the end piece, such that the end piece may be rotated in the first circumferential direction and translated parallel to the longitudinal axis when the first rotatable member is rotated.

According to an embodiment, the first rotatable member comprises at least two rotatable pins, e.g. at least three rotatable pins, wherein the at least two rotatable pins are arranged skew with respect to each other and are separated from each other, such that a guiding compartment for guiding the end piece of the string is formed between the at least two rotatable pins. Therein, each of the rotatable pins may be rotatable around a longitudinal axis of the respective rotatable pin. For example, each of the rotatable pins may be cylindrically shaped, bar-shaped, and/or rod-shaped. The rotatable pins may be arranged around a perimeter of the string and/or the end piece. In other words, the pins may be spaced apart from each other along and/or in circumferential direction of the end piece and/or the string, thereby forming the guiding compartment.

According to an embodiment, the at least two rotatable pins are arranged such that at least a part of a lateral surface and/or a tip of each pin contacts at least a part of a lateral surface of the end piece, such that the end piece is rotated and translated by rotating at least a subset (e.g. at least one) of the at least two pins around a longitudinal axis of the respective pin(s). By arranging the pins around the end piece and by arranging them skew with respect to each other, a rotational movement of the pins may induce a rotational movement and a translational movement of the end piece. Generally, the end piece can be inserted into the sample container based on rolling off one or more of the pins on the lateral surface of the end piece. Accordingly, by means of the pins, the end piece of the string may be driven and precisely guided within the guiding compartment formed by the pins. This may allow for a compact and robust design of the applicator assembly. Further, due to the skew arrangement of the pins, which ends of the pins may converge in a direction towards the sample container, the end piece can be compressed while being transported through the guiding compartment.

According to an embodiment, the first rotatable member comprises a rotatable funnel for guiding the end piece of the string, wherein the rotatable funnel comprises a conically converging inner thread configured to at least partly contact a lateral surface of the end piece, such that the end piece is rotated and translated by rotating the rotatable funnel. Therein, the inner thread may conically converge towards an end of the rotatable funnel, which end may be arranged opposite to the opening of the sample container. Generally, the inner thread may refer to a spiral guiding track, guiding rib and/or protrusion, e.g. protruding from an inner surface of the rotatable funnel.

According to an embodiment, the insertion device comprises a second rotatable member configured to contact at least a part of the string and/or a lateral surface of the string, which part of the string neighbors the end piece and/or which part is arranged adjacent to the end piece. Therein, the second rotatable member is configured to rotate the at least part of the string along and/or in a second circumferential direction of the string opposite to the first circumferential direction, such that a rotation of the second rotatable member compensates for a rotation of the end piece induced by a rotation of the first rotatable member. By means of the second rotatable member, a twisting of the remaining part of the string may be advantageously reduced, minimized and/or avoided.

It should be noted that in the context of the present disclosure, the second rotatable member may refer to any part of the applicator assembly other than the first rotatable member. In other words, the second rotatable member may refer to the remaining part of the applicator assembly other than the first rotatable member. Accordingly, the first rotatable member may induce a rotation of the end piece along the first circumferential direction, wherein this rotation may be compensated by rotating the remaining part of the applicator assembly in the second circumferential direction opposite to the first circumferential direction.

According to an embodiment, the second rotatable member is configured to annularly encompass the at least part of the string neighboring the end piece and/or being arranged adjacent to the end piece of the string. By annularly encompassing the at least part of the string, a twisting of said part of the string and/or the remaining part of the string (i.e. the part of the string other than the end piece) may efficiently be reduced and/or avoided. Also, said part may be guided, positioned, straightened and/or aligned.

According to an embodiment, the drive system comprises at least one drive wheel configured to roll off at an outer surface of the second rotatable member to rotate the second rotatable member, wherein the at least one drive wheel is coupled via a flexible coupling with the first rotatable member to rotate the first rotatable member. Accordingly, by means of the at least one drive wheel, a rotation of the end piece along the first circumferential direction thereof can be induced by rotating the first rotatable member. Further, the rotation of the end piece along the first circumferential direction can be compensated for by rotating the second rotatable member such that the part of the string neighboring the end piece is rotated in the second circumferential direction opposite the first circumferential direction. This may advantageously allow for a compact design of the applicator assembly, while also ensuring a coordinated movement of the first and second rotatable members, The second aspect of the present disclosure relates to a use of a string comprising polymer-based material with an applicator assembly for closing a sample container, as described hereinabove and hereinbelow.

The third aspect of the present disclosure relates to a method of closing a sample container with an applicator assembly, as described hereinabove and hereinbelow. The method comprises the steps of:

inserting, with an insertion device of the applicator assembly, at least a part of an end piece of a string comprising polymer-based material into an opening of the sample container; and separating, with a separator of the applicator system, the end piece from the string and/or from a remaining part of the string, thereby forming a plug closing the opening of the sample container.

Any features, functions and/or elements, as described hereinabove and hereinbelow with reference to the applicator assembly, can be features, elements, functions, and/or steps of the method, as described hereinabove and hereinbelow, and vice versa.

According to an embodiment, the step of inserting the at least part of the end piece comprises rotating the end piece along a circumferential direction of the end piece, e.g. a first circumferential direction thereof, and translating the end piece along and/or parallel to a longitudinal direction of the end piece.

According to an embodiment, the step of inserting the at least part of the end piece into the opening comprises compressing at least a part of the end piece with the insertion device.

According to an embodiment, the step of separating the end piece from the string and/or from the remaining part of the string comprises at least one of cutting off and shearing off the end piece from the remaining part of the string, thereby forming the plug.

According to an embodiment, the step of separating the end piece from the string and/or from the remaining part of the string comprises rotating at least a part of the insertion device of the applicator assembly, thereby shearing off the end piece from the string and/or from the remaining part of the string. Particularly, separating the end piece may comprise rotating the end piece and the remaining part relative to each other to shear off the end piece.

According to an embodiment, the method further comprises extruding the string using an extrusion device of the applicator assembly, thereby forming at least a part of the string. Accordingly, the applicator assembly may comprise an extrusion device configured to store a raw material, basic material and/or primary material of the string. The raw material of the string may be stored in the extrusion device e.g. in granulate form or the like. The extrusion device may be configured to heat and/or melt the raw material of the string. The molten material of the string may then be extruded via an opening of the extrusion device to form the string. Generally, this allows producing the string on demand and/or to further reduce production costs of the string as well as of the plug.

These and other aspects of the invention will be apparent from and elucidated with reference to the appended figures, which may represent exemplary embodiments.

BRIEF DESCRIPTION OF THE DRAWINGS

The subject-matter of the invention will be explained in more detail in the following with reference to exemplary embodiments which are illustrated in the attached drawings, wherein:

FIG. 1A shows an applicator assembly according to an exemplary embodiment;

FIG. 1B shows a sample container closed with the applicator assembly of FIG. 1A;

FIG. 2 shows an applicator assembly according to an exemplary embodiment;

FIG. 5C shows a perspective view of an insertion device of the applicator assembly of FIG. 5A; and FIG. 6 shows a flow chart illustrating steps of a method of closing a sample container according to an exemplary embodiment.

The figures are schematic only and not true to scale. In principle, identical or like parts are provided with identical or like reference symbols in the figures.

DESCRIPTION OF EXEMPLARY EMBODIMENTS

Figure 3:
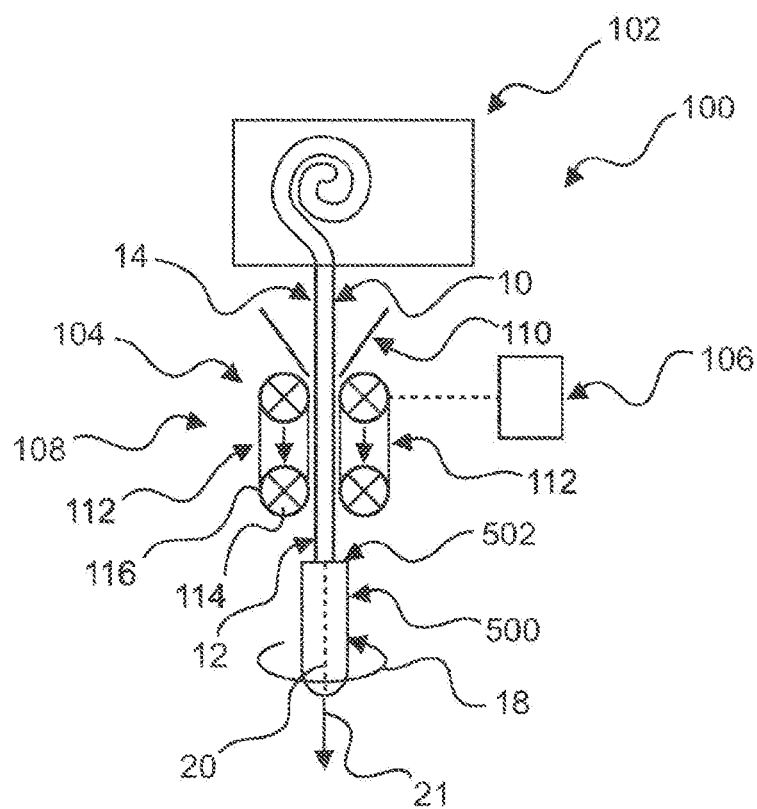
FIG. 3 shows an applicator assembly according to an exemplary embodiment.

FIG. 1A shows an applicator assembly 100 for closing a sample container 500 according to an exemplary embodiment. FIG. 1B shows a sample container 500 closed by means of the applicator assembly 100 of FIG. 1A.

The applicator assembly 100 comprises a magazine 102 configured to store, contain, hold and/or support at least a part of string 10 comprising polymer-based material. The string 10 may comprise, for instance, a foam material, a closed cell foam material, a compressible material, an elastically deformable material, an elastically compressible material, a plastic material or the like. As shown in FIG. 1A, the part of the string 10 arranged in the magazine 102 may e.g. be coiled-up, thereby allowing to efficiently store the string 10, while ensuring that the string 10 can be supplied from and/or dragged from the magazine 102 without getting stuck. Alternatively or additionally, the at least part of the string 10 and/or a further part of the string 10 may be loosely arranged in the magazine 102.

The applicator assembly 100 further comprises an insertion device 104 configured to insert an end piece 12, an end 12 and/or an end part 12 of the string 10 at least partly into an opening 502 of the sample container 500. For inserting and/or applying the end piece 12 to the opening 502 of the sample container 500, the insertion device 104 can be configured to compress at least a part of the end piece 12. Various designs and/or configurations of the insertion device 104 will be described in detail with reference to subsequent figures.

Further, the applicator assembly 100 comprises a drive system 106 and/or drive 106 configured to supply the string 10 and/or the end piece 12 of the string 10 from the magazine 102 to the insertion device 104. Alternatively or additionally, the drive system 106 is configured to drive at least a part of the insertion device 104 to insert the end piece 12 at least partly into the opening 502 of the sample container 500. For instance, the drive system 106 may be configured to pull and/or drag at least a part of the string 10, particularly the end piece 12, out of the magazine 102, thereby transporting and/or moving the end piece 12 to the insertion device 104.

The applicator assembly 100 further comprises a separator 108 configured to separate, detach and/or remove the end piece 12 of the string 10, which is at least partly inserted into the opening 502 of the sample container 500, from a remaining part 14 and/or rest 14 of the string 10. The separator 108 can be configured to cut off and/or shear off the end piece 12 of the string 10 from the remaining part 14 of the string 10, thereby forming a plug 16 closing the sample container 500 and/or the opening 502 thereof, as shown in FIG. 1B.

To separate the end piece 12 from the remaining part 14, the separator 108 may rotate the end piece 12 relative to the remaining part 14, as will be described in more detail with reference to subsequent figures. Particularly, the separator 108 may be configured to rotate at least a part of the insertion device 104, the entire insertion device 104 and/or other components of the applicator assembly 100, such that the remaining part 14 of the string 10 is rotated around the longitudinal axis 20, e.g. along a circumferential direction 18 of the end piece 12. Therein, the circumferential direction 18 may refer to a circumferential direction 18 of the insertion device 104 and/or of the sample container 500. In this example, the end piece 12 may be fixed and/or held in place while rotating the remaining part 14. Alternatively or additionally, the sample container 500 with the end piece 12 inserted therein may be rotated and the remaining part 14 may be fixed and/or held in place. Alternatively, the remaining part 14 may be rotated in one direction and the end piece 12 may be rotated in opposite direction. Alternatively or additionally, the separator 108 may comprise one or more cutting elements and/or cutters to cut at least partly through the string 10.

It should be noted that the separator 108 may be an integral part of the insertion device 104 and/or the drive system 106. By way of example, the drive system 106 may rotate the at least a part of the insertion device 104, the entire insertion device 104, and/or other components of the applicator assembly, e.g. substantially the entire applicator assembly 100, along the circumferential direction 18 of the end piece 12, e.g. while the sample container 500 may be fixed, to shear off the end piece 12 and form the plug 16.

A length of the end piece 12 and/or of the plug 16, which may be measured parallel to a longitudinal axis 20 of the end piece 12 (e.g. when it is at least partly inserted into the sample container 500) and/or of the plug 16, may range from about 0.3 mm to about 20 cm, for example from about 0.5 mm to about 5 cm. The longitudinal axis 20 of the end piece 12 may be congruent with a longitudinal axis 20 of the sample container 500 and/or of the insertion device 104. Accordingly, the longitudinal axis 20 may denote the longitudinal axis 20 of the end piece 12, the insertion device 104 and/or the sample container 500. Further, a diameter of the string 10, the end piece 12 and/or the plug 16 in a rest state, in which e.g. no compression force is applied, may range from about 3 mm to about 30 mm, for example from about 5 mm to about 20 mm. Therein, the diameter may be measured in a plane transverse and/or perpendicular to the longitudinal axis 20.

Generally, by means of the applicator assembly 100, sample containers 500 may be closed with plugs 16 in an efficient, fast, reliable and cost-efficient manner. Moreover, the applicator assembly 100 may be configured to close sample containers 500 having different sizes, diameters, diameters of the opening 502 (also referred to as opening diameters), shapes and/or geometries. Further, by using the applicator assembly 100 no further device for closing the sample containers 500, such as e.g. a re-capper robot, for decollating and/or aligning plugs before insertion thereof into the sample containers 500 may be required.

FIG. 2 shows an applicator assembly 100 according to an exemplary embodiment. If not stated otherwise, the applicator assembly 100 of FIG. 2 comprises the same features, functions and/or elements as the applicator assembly 100 described with reference to FIGS. 1A and 1B.

In the exemplary embodiment of FIG. 2, the insertion device 104 comprises a nozzle 110 and/or funnel 110 for guiding the string 10 and/or the end piece 12 towards the sample container 500. Therein a longitudinal axis 20 of the nozzle 110 may correspond to, may be aligned with, may be congruent with and/or may be parallel to the longitudinal axis 20 (see FIGS. 1A and 1B) of the end piece 12, e.g. when being inserted into the opening 502.

Further, the insertion device 104 comprises one or more linear motion elements 112 configured to translate and/or transport the end piece 12 along and/or parallel to a longitudinal direction 21 of the end piece 12. Likewise, the linear motion element 112 may be configured to pull and/or drag the string 10 out of the magazine 102. The longitudinal direction 21 may be parallel to the longitudinal axis 20 of the end piece 12 and/or parallel to a longitudinal axis 20 of the insertion device 104. Accordingly, the longitudinal direction 21 may refer to a longitudinal direction 21 of the insertion device 104, the end piece 12 and/or the sample container 500.

In the example depicted in FIG. 2, the insertion device 104 comprises two wheels 112 and/or rolls 112 as linear motion elements 112. It should be noted that the applicator assembly 100 may alternatively comprise only a single linear motion element 112 or more than two linear motion elements 112.

The two rolls 112 and/or linear motion elements 112 are arranged on two opposite sides of the string 10 and are driven and/or rotated by the drive system 106. Accordingly, the string 10 and/or the end piece 12 thereof may be interposed between the two linear motion elements 112. The two linear motion elements 112 roll off at an outer surface and/or lateral surface of the string 10, such that a translational force parallel to and/or in the longitudinal direction 21 is exerted onto the string 10. Accordingly, by means of the linear motion elements 112, the end piece 12 and/or the string 10 can be conveyed into the opening 502 of the sample container 500. Optionally, the nozzle 110 may be moved parallel to and/or in the longitudinal direction 21 of the end piece 12, e.g. away from the magazine 102, in order to insert the end piece 12 into the opening 502. Alternatively or additionally, the sample container 500 may be moved in a direction opposite to the longitudinal direction 21 to insert the end piece 12 into the sample container 500.

Further, a separation and/or distance (measured transverse and/or perpendicular to the longitudinal axis 20) between the two linear motion elements 112 may be chosen such that the end piece 12 is at least partly compressed. This may simplify insertion of the end piece 12 into the opening 502. In order to keep the end piece 12 in a compressed state during insertion, an end 111 of the nozzle 110 may be arranged between the sample container 500 and the linear motion elements 112. Optionally, the end 111 of the nozzle 110 may be at least partly inserted into the opening 502 and/or an interior volume of the sample container 500. For this purpose, the nozzle 110 and/or the end 111 of the nozzle 110 may be moved towards and/or in direction of the sample container 500, e.g. along the longitudinal direction 21. Alternatively or additionally, the sample container 500 may be moved towards the nozzle 110 and/or the end 111 thereof, e.g. in opposite direction as the longitudinal direction 21.

The applicator assembly 100 of FIG. 2 further comprises a separator 108 for cutting off and/or shearing off the end piece 12 to form the plug 16. Therein, the separator 108 may be configured as described hereinabove and hereinbelow in more detail. For separating the end piece 12 from the remaining part 14 of the string 10, the nozzle 110 and/or the end 111 thereof may be moved away from the sample container 500, e.g. in opposite direction as the longitudinal direction 21. Alternatively or additionally, the sample container 500 may be moved away from the nozzle 110 and/or the end 111 thereof, e.g. along the longitudinal direction 21.

Optionally, the separator 108 may be configured to fix a part of the end piece 12 extending from the sample container 500 in order to keep the end piece 12 at least partly in the opening 502 during separation of the end piece 12 and/or during formation of the plug 16. By way of example, the separator 108 may comprise a fixing element and/or clamping element arranged between the sample container 500 and the end 111 of the nozzle 110 in order to fix the end piece 12 during separation of the end piece 12.

As described with reference to FIGS. 1A and 1B, the separator 108 may be configured to shear off, pinch off and/or cut off the end piece 12, e.g. by rotating the remaining part 14 of the string 10 relative to the end piece 12. This may be achieved by rotating at least a part of the insertion device 104, the entire insertion device 104 and/or other components of the applicator assembly 100, e.g. along the circumferential direction 18, while fixing the sample container 500, or by rotating the sample container 500 while fixing the remaining part 14 of the string 10 by means of the insertion device, or by rotating the sample container 500 and the remaining part 14 in opposite directions.

FIG. 3 shows an applicator assembly 100 according to an exemplary embodiment. If not stated otherwise, the applicator assembly 100 of FIG. 3 comprises the same features, functions and/or elements as the applicator assemblies 100 described with reference to aforegoing figures.

Similar to the exemplary embodiment shown in FIG. 2, the applicator assembly 100 of FIG. 3 comprises two linear motion elements 112. In contrast to the embodiment of FIG. 2, the linear motion elements 112 of FIG. 3 are designed as belt drives 112, wherein each belt drive 112 comprises at least two rotatable wheels 114 and/or rolls 116 for driving a belt 116. Therein, the rolls 116 and/or the belt drives 112 may be driven by the drive system 106.

Figure 4:
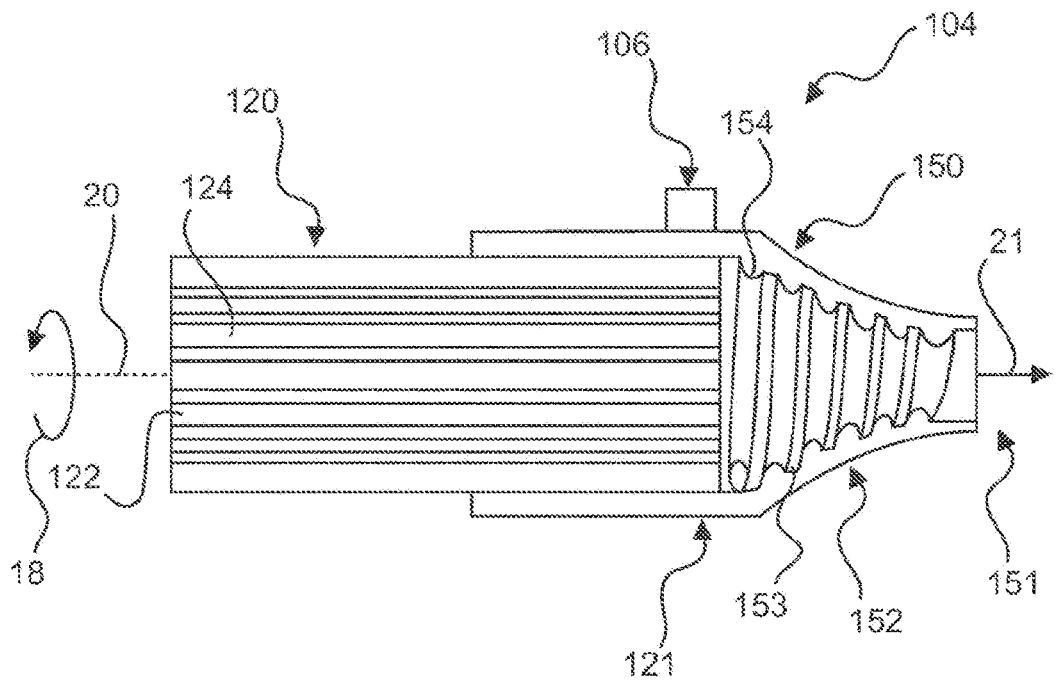
FIG. 4 shows a sectional view of a part of an insertion device of an applicator assembly according to an exemplary embodiment.

FIG. 4 shows a sectional view of a part of an insertion device 104 of an applicator assembly 100 according to an exemplary embodiment. If not stated otherwise, the applicator assembly 100 of FIG. 4 comprises the same features, functions and/or elements as the applicator assemblies 100 described with reference to aforegoing figures.

The insertion device 104 of FIG. 4 comprises a static part 120, which is tubular shaped and at least partly encompasses, particularly annularly encompasses, a part of the string 10, e.g. along a circumference and/or perimeter of the string 10. The static part 120 may e.g. be formed as a hollow cylinder, wherein the string 10 is guided in an interior volume of the static part 120. On an inner surface 122 of the static part 120, which inner surface 122 faces and/or is directed towards the string 10, the static part 120 comprises one or more guiding rips 124, which extend from the inner surface 122 towards the longitudinal axis 20. Further, the guiding rips 124 extend and/or stretch parallel to the longitudinal axis 20 of the insertion device 104. The guiding rips 122 are configured to contact the string 10 at a lateral surface of the string 10, such that the string 10 is guided along the longitudinal direction of the insertion device 104 and at least partly fixed in circumferential direction 18 around the longitudinal axis 20.

The insertion device 104 further comprises a rotatable member 150 arranged at an end 121 of the static part 120. The rotatable member 150 may be referred to as first rotatable member 150 in the context of the present disclosure. The rotatable member 150 comprises and/or is configured as a rotatable funnel 152 that conically converges from the end 121 of the static part 120, which end 121 may denote a first end 121 of the rotatable member 150, towards an opposite (and/or second) end 151 of the rotatable member 150, e.g. along the longitudinal direction 21. By means of the rotatable funnel 152, the string 10 and/or the end piece 12 is compressed while being transported along the longitudinal direction 21 through the rotatable funnel 152.

For transporting and/or moving the string 10 and/or the end piece 12 through the insertion device 104 and/or into the sample container 500, the rotatable funnel 152 and/or the rotatable member 150 comprises an inner thread 154 arranged on an inner surface 153 of the rotatable funnel 152. Therein, the inner thread 152 conically converges from the first end 121 of the rotatable member 150 towards the second end 151 of the rotatable member 151. The inner thread 152 is configured to contact a lateral surface of the end piece 12.

For inserting the end piece 12 into the sample container 500 and/or for conveying the string 10, the rotatable member 150 is rotated by the drive system 106 along the circumferential direction 18. When the rotatable member 150 is rotated, the inner thread 152 contacts the lateral surface of the end piece 12 and exerts a translational force directed along the longitudinal direction 21 and a rotational force directed along the circumferential direction 18 onto the end piece 12, such that the end piece 12 is moved and/or dragged into the opening 502 of the sample container 500.

As exemplary shown in FIG. 4, the drive system 106 may drive the rotatable member 150 at an outer surface of the rotatable member 150. For this purpose, the drive system 106 may e.g. comprise a gear drive and/or gear wheel drive and on the outer surface of the rotatable member 150 corresponding gear teeth may be arranged that may engage with the gear drive of the drive system 106. Alternatively or additionally any other drive mechanism may be used, such as e.g. a belt drive for driving and/or rotating the rotatable member 150. It should be noted, however, that the drive system 106 may alternatively or additionally be arranged, e.g. near the first end 121, between the static part 120 and the rotatable member 150 of the insertion device 104 in a radial direction of the insertion device 104. For example, a rolling contact bearing may be used to rotate and/or drive the rotatable member 150.

During operation and/or rotation of the rotatable member 150, the end piece 12 is twisted along the circumferential direction 18. To ensure that this twist is not transferred to the remaining part 14 of the string 10, the remaining part 14 of the string 10 can be fixed by means of the guiding rips 124 of the static part 120. Alternatively or additionally, however, the static part 120 may be rotated in opposite direction as the rotatable member 150, e.g. in accordance with the embodiment described with reference to FIGS. 5A to 5C.

Figure 5A:
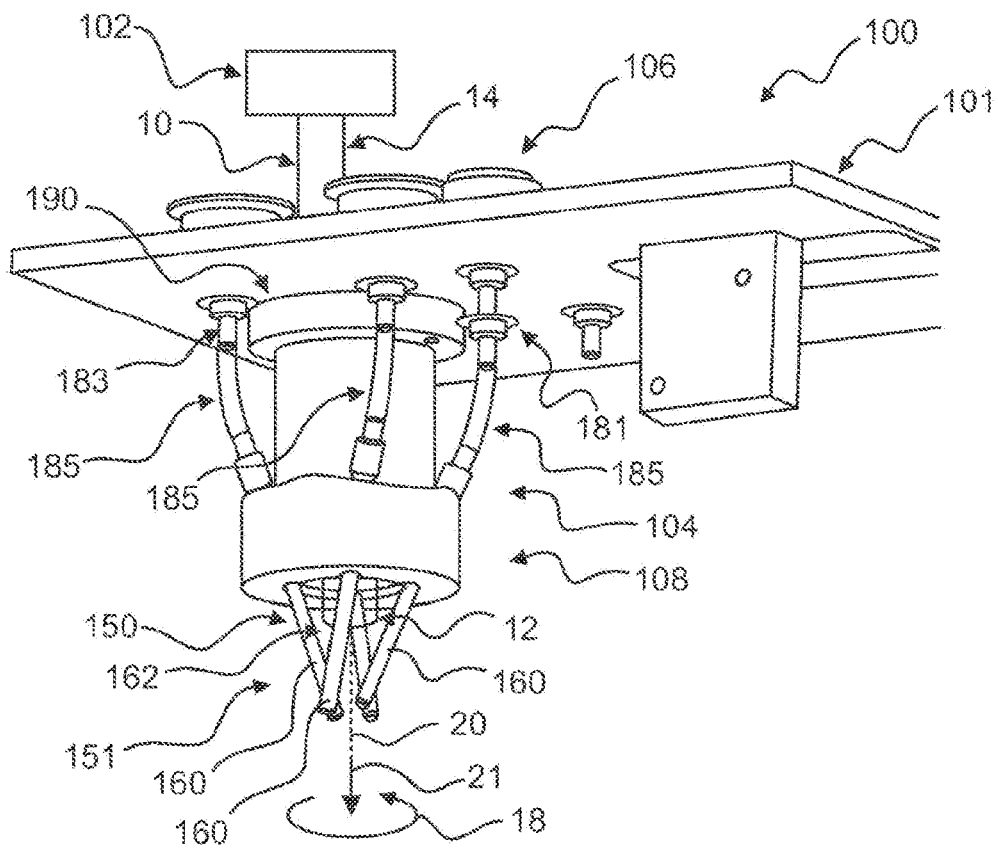
FIG. 5A shows a perspective view of an applicator assembly according to an exemplary embodiment.
Figure 5B:
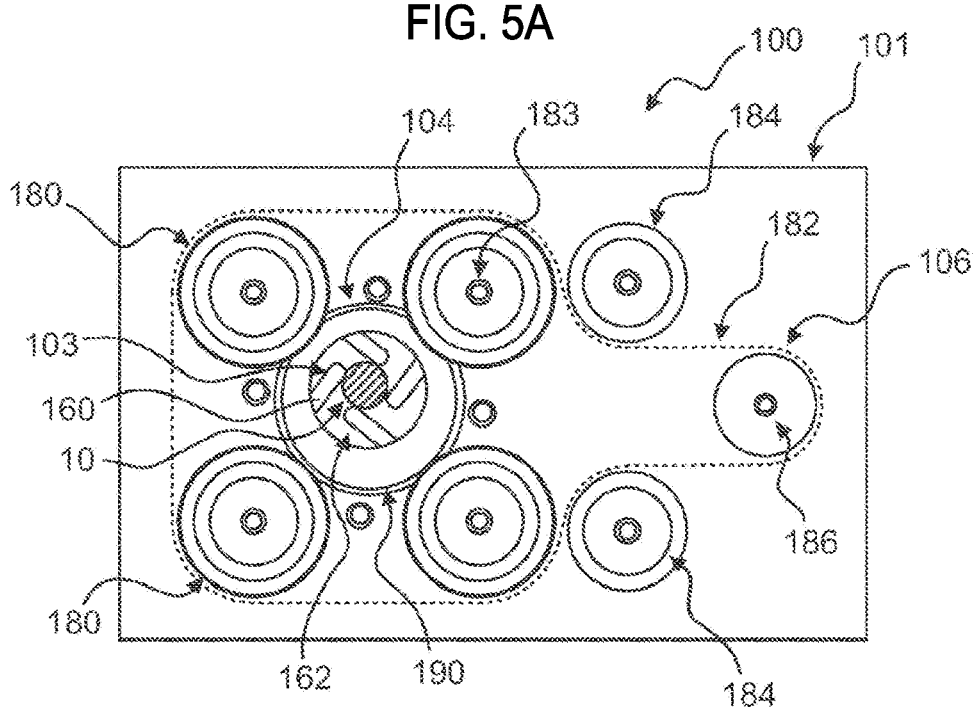
FIG. 5B shows a top view of a part of the applicator assembly of FIG. 5A.

FIG. 5A shows a perspective view of an applicator assembly 100 according to an exemplary embodiment. FIG. 5B shows a top view of a part of the applicator assembly 100 of FIG. 5A. FIG. 5C shows a perspective view of an insertion device 104 of the applicator assembly 100 of FIG. 5A. If not stated otherwise, the applicator assembly 100 of FIGS. 5A to 5C comprises the same features, functions and/or elements as the applicator assemblies 100 described with reference to aforegoing figures. It should be noted that for reasons of clarity, the string 10 and the end piece 12 are only schematically shown in FIGS. 5A and 5B and not shown in FIG. 5C.

The applicator assembly of FIGS. 5A to 5C comprises a base plate 101 and/or mounting plate 101, on which at least a part of the drive system 106 is arranged, as described in more detail hereinbelow. The mounting plate 101 comprises an opening 103 and/or hole 103 through which the string 10 and/or the end piece 12 is transported from the magazine 102 to the insertion device 104 by means of the drive system 106 and/or by means of the insertion device 104.

The insertion device 104 comprises a first rotatable member 150 arranged at an end 151 of the insertion device 104. Via the first rotatable member 150, the end piece 12 of the string 10 is conveyed towards the sample container 500 (not shown) and inserted at least partly into the opening 502 of the sample container 500. Accordingly, the sample container 500 may be arranged opposite to the end 151 of the insertion device 104.

The first rotatable member 150 exemplary comprises four rotatable pins 160 which are bar-shaped and/or cylindrically shaped. It should be noted, however, that the first rotatable member 150 may comprise less than four pins 160, e.g. at least two rotatable pins 160 and/or at least three rotatable pins 160, or more than four rotatable pins 160. In other words, the first rotatable member 150 may comprise a plurality of rotatable pins 160.

The pins 160 are arranged skew with respect to each other and are spaced apart from each other along the circumferential direction 18 (referred to as first circumferential direction 18 in the following) of the insertion device 104 and/or the end piece 12, such that a guiding compartment 162 for guiding the end piece 12 is formed between the pins 160. Each of the pins 160 is rotatable around a longitudinal axis of the respective pin 160, wherein the pins 160 are driven by the drive system 106. Further, the pins 160 are arranged so as to exert a translational force along the longitudinal direction 21 of the insertion device 104 and a rotational force along the first circumferential direction 18 onto the end piece, when the pins 160 are rotated around their longitudinal axes. Specifically, when the pins 160 are rotated, at least a part of each pin 160 and/or a tip of each pin 160 rolls off at an outer surface and/or lateral surface of the end piece 12. Thereby, the end piece 12 of the string is translated towards the end 151 of the insertion device 104 in order to insert the end piece 12 into the sample container 500 and rotated along the first circumferential direction 18.

Further, due to the skew relative position of the pins 160, the pins 160 converge towards the longitudinal axis 20 along the longitudinal direction 21 of the insertion device 104, such that at least a part of the end piece 12 is compressed close to and/or at the end 151 of the insertion device 104 (and/or near the tips of the pins 160). This may allow to efficiently insert the end piece 12 at least partly into the opening 502 of the sample container 500.

For rotating the pins 160 around their longitudinal axes, the drive system 106 comprises a plurality of drive wheels 180 arranged on the mounting plate 101, particularly on a side of the mounting plate 101 opposite to a further side of the mounting plate 101, on which the insertion device 104 is arranged. In the example shown in FIGS. 5A to 5C, the drive system 106 comprises four drive wheels 180 arranged around the opening 103 of the mounting plate 101. The drive wheels 180 are driven by a belt 182, wherein the belt 182 is tensioned by means of two pulleys 184 which are arranged between the four drive wheels 180 and a further drive wheel 186, as can best be seen in FIG. 5B. Therein, the further drive wheel 186 may be driven by an electric motor of the drive system in order to drive the belt 182 and the drive wheels 180. It should be noted, however, that the configuration and design of the drive system 106 of FIGS. 5A to 5C is exemplary only.

Each of the drive wheels 180 that are arranged around the opening 103 of the mounting plate 101 are mounted to the mounting plate 101 via a bearing 181 arranged in a respective opening of the mounting plate 101. Further, a shaft 183 is arranged at a center of each of the driving wheels 180, wherein the shaft 181 of each driving wheel 180 extends through the respective opening of the mounting plate parallel to the longitudinal axis 20. On a side of the mounting plate 101 opposite to side of the mounting plate 101 on which the drive wheels 180 are arranged, a flexible coupling 185 is arranged on each of the shafts 183. Each of the flexible couplings 185 is coupled with one end to one of the shafts 183 and with an opposite end to one of the pins 160. By means of the flexible couplings 185, a rotation of the drive wheels 180 induces a rotation of the corresponding pin 160 coupled thereto. Generally, the flexible couplings 185 may e.g. be hose-like and/or tube-like elements.

As discussed above, due to the rotation of the pins 160, which roll off on a lateral surface of the end piece 12, the end piece 12 is rotated along the first circumferential direction 18 and translated along the longitudinal direction 21. In order to compensate for this rotation, the insertion device 104 comprises a second rotatable member 190 which is configured to rotate the remaining part 14 of the string 10 (and/or a part of the string 10 adjacent and/or near the end piece 12) in a second circumferential direction opposite to the first circumferential direction 18. In the example shown in FIGS. 5A to 5C, the second rotatable member 190 is cylindrically shaped and arranged at least partly in the opening 103 of the mounting plate 101. The second rotatable member 190 may be held in the opening 103 of the mounting plate 101 by means of a respective bearing. Therein, the string 10 may be encompassed and/or annularly encompassed by the second rotatable member 190, e.g. around a circumference and/or perimeter of the string 10.

To rotate the second rotatable member 190 as well as the remaining part 14 of the string 10 (and/or a part of the string 10 adjacent and/or near the end piece 12) along the second circumferential direction, the drive wheels 180 roll off at an outer surface and/or edge of second rotatable member 190.

Accordingly, the end piece 12 of the string is dragged and/or supplied from the magazine 102 via the first rotational member 150 of the insertion device 104, which translates the end piece 12 in the longitudinal direction 21 and rotates the end piece 12 along the first circumferential direction 18. To compensate for a twist in the string 10 induced by this rotation, the second rotatable member 190 rotates the remaining part 14 of the string 10 (and/or a part of the string 10 adjacent and/or near the end piece 12) in a direction opposite to the first circumferential direction 18.

Once the end piece 12 is at least partly inserted into the opening 502 of the sample container 500, the end piece 12 may be cut off and/or shorn off by means of the separator 108, e.g. as described with reference to the aforegoing figures. For example, the end piece 12 may be fixed with the pins 160 of the insertion device 104 and the insertion device 104 may be rotated along the first circumferential direction or in opposite direction around the longitudinal axis 20. For example, the mounting plate 101 may be rotated by the separator 108 in order to shear off the end piece 12 and form the plug 16.

FIG. 6 shows a flow chart illustrating steps of a method for closing a sample container 500 with an applicator assembly 100 according to an exemplary embodiment. The applicator assembly 100 may refer to any of the applicator assemblies 100 described with reference to aforegoing figures.

In step S1, at least a part of an end piece 12 of a string 10 comprising polymer-based material is inserted into an opening 502 of a sample container 500 with an insertion device 104 of the applicator assembly 100. Therein, the end piece 12 may be rotated e.g. along the first circumferential direction 18 and translated along the longitudinal direction 21 and/or parallel to the longitudinal axis 20 of the end piece 12

(and/or of the insertion device 104). Optionally, at least a part of the end piece 12 may be compressed by the insertion device 104 in step S1.

In step S2, the end piece 12 is separated from the string 10 and/or from a remaining part 14 of the string 10 by means of a separator 108 of the applicator assembly 100, thereby forming a plug 16 closing the opening 502 of the sample container 500. Therein, the end piece 12 may be separated based on cutting off and/or shearing off the end piece 12. Optionally, step S2 may comprise rotating at least a part of the insertion device 104 to shear off the end piece 12. Further, step S2 may optionally comprise fixing and/or fixating at least a part of the end piece 12.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An applicator assembly for closing a sample container with a plug, the applicator assembly comprising:
    a magazine configured to store a string comprising polymer-based material;
    an insertion device configured to insert an end piece of the string at least partly into an opening of the sample container;
    a drive system configured to supply at least a part of the string from the magazine to the insertion device and/or configured to drive at least a part of the insertion device to insert the end piece at least partly into the opening of the sample container; and
    a separator configured to separate the end piece from the string, such that the end piece forms a plug closing the sample container, wherein the separator is configured to rotate at least a part of the insertion device along a circumferential direction of the end piece to shear off the end piece from the string.

2. The applicator assembly according to claim 1, wherein the separator is configured to cut off and/or shear off the end piece from the string to form the plug.

3. The applicator assembly claim 1, wherein the string comprises at least one material selected from the group consisting of: a foam material, a closed cell foam material, a compressible material, and a plastic material.

4. The applicator assembly according to claim 1, wherein the insertion device is configured to compress at least a part of the end piece to insert the end piece of the string at least partly into the opening of the sample container.

5. The applicator assembly according to claim 1, wherein the insertion device comprises at least one linear motion element configured to translate the end piece of the string along and/or parallel to a longitudinal direction of the end piece to insert the end piece at least partly into the opening of the sample container.

6. The applicator assembly according to claim 1, wherein the insertion device comprises a first rotatable member configured to rotate the end piece of the string along a first circumferential direction of the end piece and to translate the end piece of the string along a longitudinal direction of the end piece to insert the end piece at least partly into the opening of the sample container.

7. The applicator assembly according to claim 6, wherein:
    the first rotatable member comprises at least two rotatable pins; and
    the at least two rotatable pins are arranged skew with respect to each other and are separated from each other, such that a guiding compartment for guiding the end piece of the string is formed between the at least two rotatable pins.

8. The applicator assembly according to claim 7, wherein the at least two rotatable pins are arranged such that at least a part of a lateral surface and/or a tip of each pin contacts at least a part of a later surface of the end piece, such that the end piece is rotated and translated by rotating at least a subset of the at least two pins around a longitudinal axis thereof.

9. The applicator assembly according to claim 6, wherein the first rotatable member comprises a rotatable funnel for guiding the end piece of the string, wherein the rotatable funnel comprises a conically converging inner thread configured to at least partly contact a lateral surface of the end piece, such that the end piece is rotated and translated by rotating the rotatable funnel.

10. The applicator assembly according to claim 6, wherein:
    the insertion device comprises a second rotatable member configured to contact at least a part of the string neighboring the end piece of the string; and
    the second rotatable member is configured to rotate the at least part of the string along a second circumferential direction of the string opposite to the first circumferential direction, such that a rotation of the second rotatable member compensates for a rotation of the end piece induced by a rotation of the first rotatable member.

11. The applicator assembly according to claim 10, wherein the second rotatable member is configured to annularly encompass the at least part of the string neighboring the end piece.

12. The applicator assembly according to claim 10, wherein:
    the drive system comprises at least one drive wheel configured to roll off at an outer surface of the second rotatable member to rotate the second rotatable member; and
    the at least one drive wheel is coupled via a flexible coupling with the first rotatable member to rotate the first rotatable member.

13. A method comprising:
    providing an applicator assembly that includes:
        a magazine configured to store a string comprising polymer-based material;
        an insertion device configured to insert an end piece of the string at least partly into an opening of the sample container;
        a drive system configured to supply at least a part of the string from the magazine to the insertion device and/or configured to drive at least a part of the insertion device to insert the end piece at least partly into the opening of the sample container; and
        a separator configured to separate the end piece from the string, such that the end piece forms a plug closing the sample container, wherein the separator is configured to rotate at least a part of the insertion device along a circumferential direction of the end piece to shear off the end piece from the string; and using the string to close the sample container.

14. A method of closing a sample container with an applicator assembly, the method comprising the steps of:

inserting, with an insertion device of the applicator assembly, at least a part of an end piece of a string comprising polymer-based material into an opening of the sample container; and separating, with a separator of the applicator system, the end piece from the string, thereby forming a plug closing the opening of the sample container, wherein the separator is configured to rotate at least a part of the insertion device along a circumferential direction of the end piece to shear off the end piece from the string.

* * * * *